United States Patent
Soundararajan et al.

(10) Patent No.: US 8,938,680 B2
(45) Date of Patent: Jan. 20, 2015

(54) METHODS AND APPARATUS FOR E-MAIL-BASED MANAGEMENT OF VIRTUALIZED ENVIRONMENTS

(75) Inventors: Vijayaraghavan Soundararajan, Palo Alto, CA (US); Balaji Parimi, Sunnyvale, CA (US); Raja Rao Dv, San Mateo, CA (US)

(73) Assignee: VMware, Inc., Palo Alto, CA (US)

( * ) Notice: Subject to any disclaimer, the term of this patent is extended or adjusted under 35 U.S.C. 154(b) by 83 days.

(21) Appl. No.: 13/402,475

(22) Filed: Feb. 22, 2012

(65) Prior Publication Data

US 2013/0219297 A1    Aug. 22, 2013

(51) Int. Cl.
*G06F 3/048* (2013.01)
*H04L 12/58* (2006.01)
*G06F 15/173* (2006.01)

(52) U.S. Cl.
CPC .............. *H04L 12/58* (2013.01); *G06F 15/173* (2013.01)
USPC .......................................... 715/752; 709/224

(58) Field of Classification Search
CPC ..... H04L 12/58; H04L 43/08; H04L 43/0817; H04L 12/2602
USPC ........................................................ 715/752
See application file for complete search history.

(56) References Cited

U.S. PATENT DOCUMENTS

| | | | |
|---|---|---|---|
| 8,171,201 B1 * | 5/2012 | Edwards, Sr. ...................... 711/6 |
| 2004/0019643 A1 * | 1/2004 | Zirnstein, Jr. .................. 709/206 |
| 2008/0040480 A1 * | 2/2008 | Motoyama et al. ........... 709/224 |
| 2008/0250277 A1 * | 10/2008 | Yoshida et al. .................. 714/57 |
| 2009/0132423 A1 * | 5/2009 | Liu .................................. 705/70 |
| 2010/0279667 A1 * | 11/2010 | Wehrs et al. ................ 455/414.1 |
| 2012/0124580 A1 * | 5/2012 | Bouchier et al. .................. 718/1 |
| 2013/0246685 A1 * | 9/2013 | Bhargava et al. ................. 711/6 |

* cited by examiner

*Primary Examiner* — Tuyetlien Tran
*Assistant Examiner* — Jaime Duckworth (57) ABSTRACT

A technique for remotely managing virtual machines employs a user interface (UI) of a rich e-mail client that is configured to interpret metadata included in a communication received from a management server for the virtual machines and, in response, generate one or more UI elements. The UI includes a first region that displays a message from the management server and a second region that displays the one or more UI elements for causing a command to be generated and sent to the management server in response to a predetermined input made thereon.

18 Claims, 7 Drawing Sheets

METHODS AND APPARATUS FOR E-MAIL-BASED MANAGEMENT OF VIRTUALIZED ENVIRONMENTS

BACKGROUND

Software for managing a virtualized data center is responsible for monitoring physical hosts and virtual machines (VMs) running in the physical hosts and, further, for performing management operations such as provisioning and configuration tasks. One example of such management software is vSphere™ available from VMware, Inc. of Palo Alto, Calif. The set of hosts, VMs, data storage units, networks, and the organization of these elements into data centers, clusters, and resource pools, managed by such software, is commonly referred to as a virtualized computer inventory (hereinafter referred to as the "inventory").

In a conventional virtualized data center, one or more administrators are responsible for monitoring and managing the operation of the virtualized data center. The administrators carry out such tasks typically using a management terminal having a graphical user interface or a command-line interface to interact with the management software. In response, the management terminal issues appropriate management instructions to the management software over a network, such as a local area network (LAN), a wide area network (WAN), a Virtual Private Network (VPN), or other suitable communication networks.

The ability to manage the virtualized data center from a remote device has become increasingly important, especially in scenarios where an administrator may be out of the office. Administrators may utilize a remote device (e.g., a smartphone, personal digital assistant, tablet computer) running a management terminal software application to interact with the management software. However, as remote devices proliferate and utilize a wide variety of hardware and software platforms, it becomes challenging to provide and support a management terminal software application that is compatible with all the different hardware and software platforms.

SUMMARY

One or more embodiments of the invention provide a cross-platform technique for remotely managing virtual machines. The cross-platform technique employs a user interface (UI) of a rich e-mail client that is generated in response to a status communication received from a management server for the virtual machines. The UI includes a first region that displays a message from the management server and a second region that displays a UI element for causing a command to be generated and sent to the management server in response to a predetermined input made thereon.

A computing device according to an embodiment of the invention includes a display, and a processor programmed to generate a UI on the display, wherein the UI includes a first region for displaying a message from a management server for managing virtual machines, and a second region for displaying a UI element that causes a command to be generated and sent to the management server in response to a predetermined input made thereon.

A method of processing communications from a management server for managing virtual machines, according to an embodiment of the invention, includes the steps of detecting receipt of a status communication from a management server for managing virtual machines, generating a UI that includes a first region for displaying a message from the management server contained within the status communication and a second region for displaying a UI element, detecting a predetermined input on the UI element, and upon detecting the predetermined input on the UI element, generating a command and sending the command to the management server.

Embodiments of the present invention further include a non-transitory computer-readable storage medium storing instructions that when executed by a computer system cause the computer system to perform the method set forth above.

DETAILED DESCRIPTION

Figure 1:
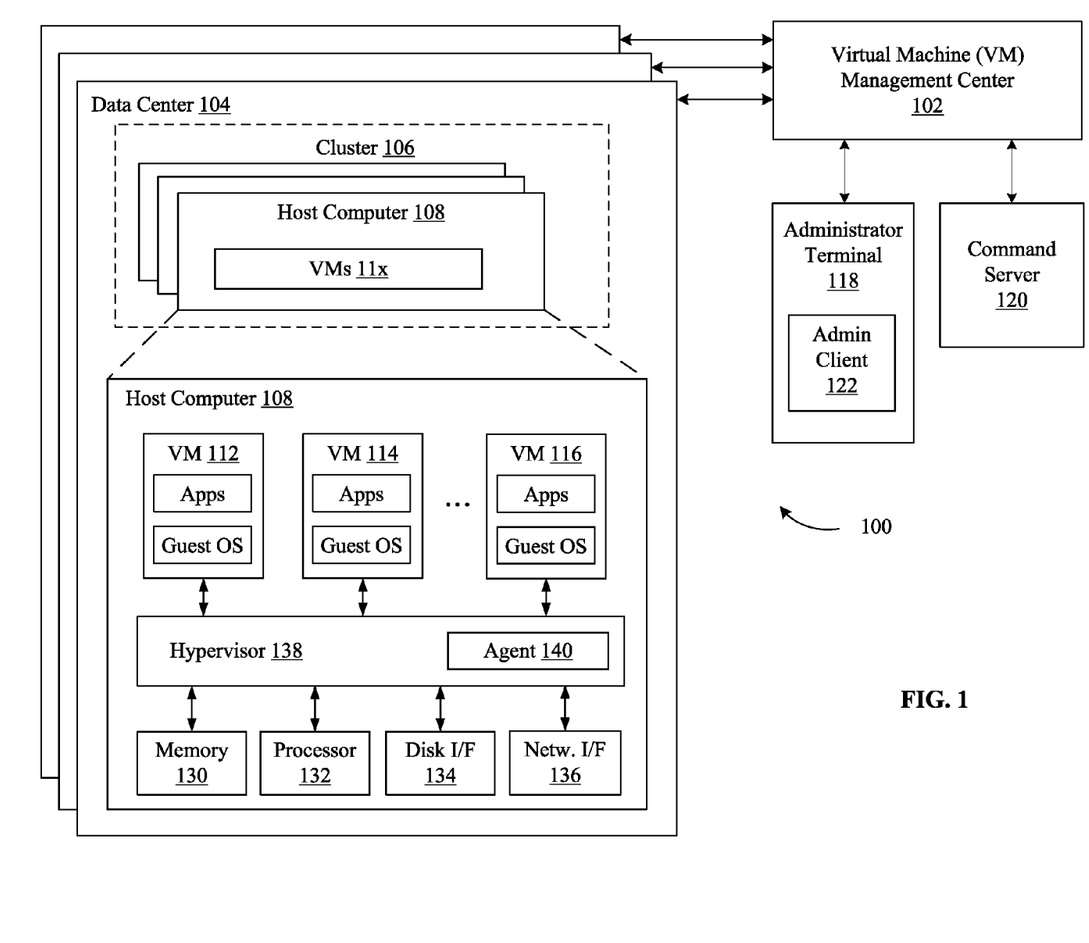
FIG. 1 is a block diagram that illustrates a virtualized computer system with which one or more embodiments of the present invention may be utilized.

FIG. 1 is a block diagram that illustrates a virtualized computer system 100 with which one or more embodiments of the present invention may be utilized. As illustrated, the virtualized computer system 100 includes one or more data centers, each data center having a plurality of host computers 108. For clarity, only a first data center 104 is shown. The host computers 108 may further be organized into one or more clusters 106. The host computers 108 (also referred to as "servers") are configured to support a virtualized environment and to deliver one or more application services related to information technology, including but not limited to, web services, database services, data processing services, and directory services.

Each host computer 108 may include conventional components of a computing device, such as memory 130, a processor 132, a disk interface 134, and a network interface 136. Examples of the disk interface 134 are a host bus adapter and a network file system interface. An example of the network interface 136 is a network adapter, also referred to as a Network Interface Card (NIC). In some embodiments, a plurality of NICs is included in the network interface 136. Each host computer 108 provides a virtualization layer that abstracts processor, memory, storage, and/or networking resources into multiple virtual machines (VMs) that run concurrently on the same host computer 108. As shown, one or more virtual machines are configured within the host computer 108, represented in FIG. 1 as VM 112, VM 114, and VM 116, which share the hardware resources of host computer 108.

The virtual machines run on top of a software interface layer 138 (referred to herein as a "hypervisor") that enables sharing of the hardware resources of the host computer 108 by the virtual machines. The hypervisor 138 may run on top of the operating system of the host computer 108 or directly on hardware components of the host computer 108. Each virtual machine includes a guest operating system and one or more guest applications running on top of the guest operating system. As also shown, an agent 140 is provided in the hypervisor 138, by which specific information pertaining to the virtualization settings and configurations of the host computer 108, and any VMs included therein, is transmitted to a VM management center 102, discussed below, according to a schedule or in response to queries by the VM management center 102.

The VM management center 102 is a computer program that resides and executes in a central server, which may reside in one of data centers 104, or alternatively, running as a VM in one of the host computers 108. The VM management center 102 is in communication with each of the data centers 104, clusters 106, and host computers 108, and carries out administrative tasks for the virtualized computer system 100 including, but not limited to, managing the data centers 104, managing the virtual machines running within each host computer 108, provisioning the virtual machines, migration of virtual machines from one host computer to another, allocating physical resources, such as processor and memory, load balancing between host computers 108 and clusters 106, and so on. In one embodiment, the VM management center 102 interacts with an agent included in the host computers 108, such as the agent 140, to exchange information using application programming interface (API) calls.

The VM management center 102 may perform administrative tasks for the virtualized computer system 100 autonomously, or may perform administrative tasks in response to one or more commands issued by a system administrator. A system administrator may access the VM management center 102 via an administrator terminal 118 that is connected to the management center via a local area network (LAN) connection or a wide area network (WAN) connection. The connection may be secured using a Virtual Private Network (VPN) or other suitable means. The administrator terminal 118 may be any computing device that includes conventional components, such as a processor, memory, storage, and network interface. To support a direct interface with the VM management center 102, the administrator terminal 118 may include a software application (depicted as an administrative client 122 in FIG. 1), that produces a graphical user interface or a command-line interface. As discussed above, as new computing devices, particularly remote devices, proliferate and utilize a variety of hardware and software platforms, it may be challenging to implement and maintain an administrative client that is compatible with the variety of hardware and software platforms in the marketplace.

Accordingly, in one or more embodiments of the invention, a system administrator manages the VM management center 102 by receiving e-mail messages from and issuing commands to an administrator command server 120 that is in communication with the VM management center 102, which enables the system administrator to remotely manage the virtualized computing system 100 using, e.g., a remote device. In particular, embodiments of the invention integrate rich functionality into an e-mail client to enable the administrator to be notified when issues occur within the virtualized computing system 100, view information associated with the issues, and/or issue commands to the virtualized computing system 100 via the e-mail client to alleviate the issues. Advantageously, because most e-mail clients include standardized interfaces that are understood by administrators, the inadequacies and learning curve common with traditional virtualization management software is eliminated.

In one embodiment, the administrator command server 120 is configured to communicate with the VM management center 102 to transmit messages (e.g., messages that include management instructions) to and receive messages (e.g., status messages) from the VM management center 102. The administrator command server 120 may be communicatively coupled to the VM management center 102 via an interprocess communication (IPC) system, including, but not limited to, network sockets, shared memory, remote procedure calls (RPC), and/or a web services API (Application Program Interface). Details of the administrator command server 120 are discussed and shown in greater detail in FIG. 2. While the administrator command server 120 is depicted in FIGS. 1 and 2 as a separate component that resides and executes on a separate central server, it should be recognized that the administrator command server 120 may alternatively reside in any one of the computing devices of the virtualized computing system 100, such as the same central server where the VM management center 102 resides.

Figure 2:
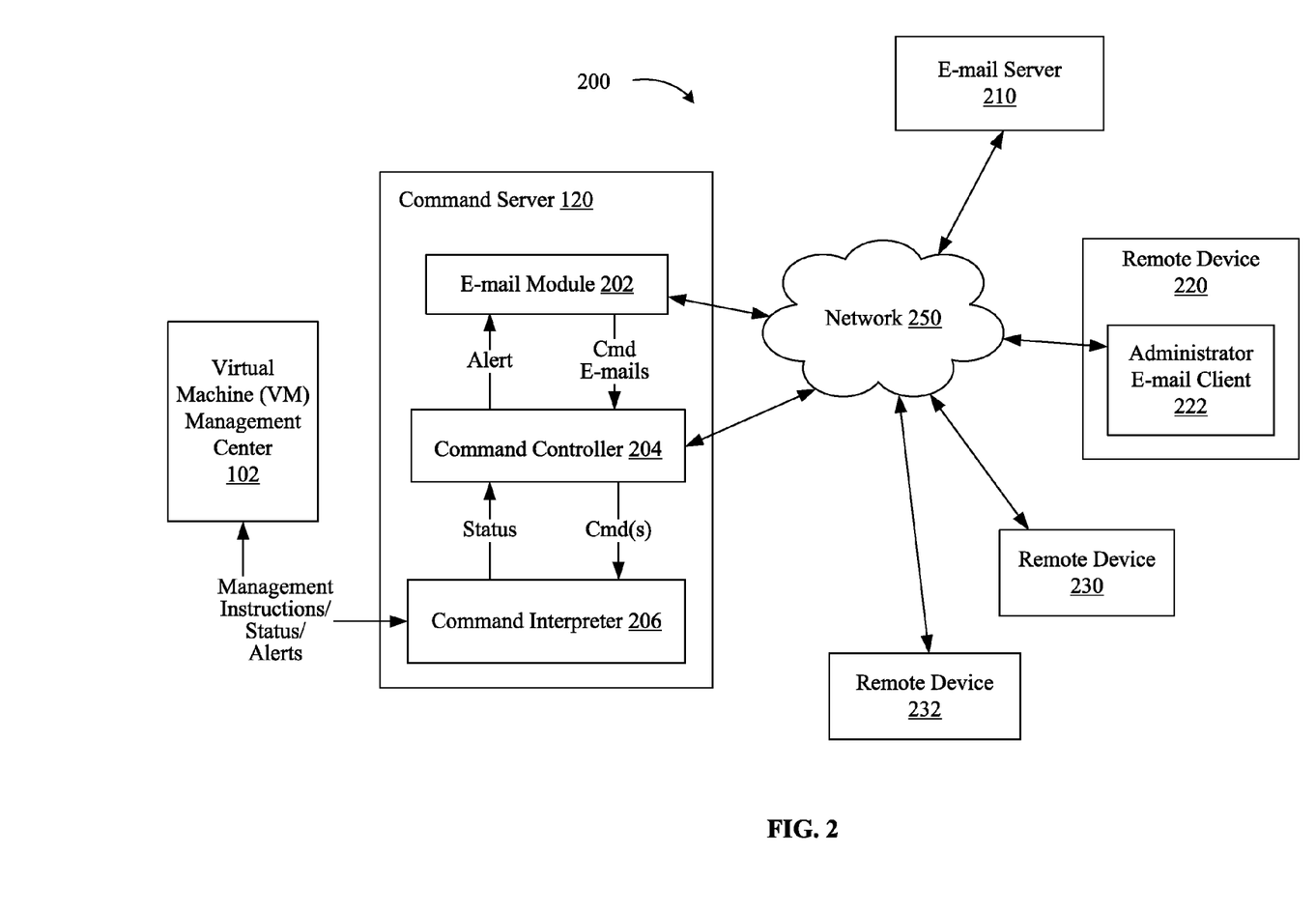
FIG. 2 is a block diagram that illustrates a system for implementing a method for e-mail-based management of the virtualized computer system of FIG. 1, according to one embodiment of the present invention.

FIG. 2 is a block diagram that illustrates a system 200 for implementing a method for e-mail-based management of the virtualized computer system 100 of FIG. 1, according to one embodiment of the present invention. As shown, the system 200 includes the administrator command server 120 communicatively coupled to the VM management center 102 of FIG. 1, an e-mail server 210, and a plurality of remote devices 220, 230, 232, each connected to a communications network 250. The remote device 220 is configured to be operable by a system administrator or other suitable user to communicate with the VM management center 102 according to embodiments of the invention described herein. The remote device 220 may be a smartphone, a tablet computing device, a personal digital assistant (PDA), a laptop computer, a desktop computer, and in general other suitable computing devices. The remote device 220 is described in detail herein, while discussion of the remote devices 230, 232 is omitted for sake of brevity. It should be understood that the other remote devices 230, 232 may have similar elements and be configured similarly as the remote device 220, according to embodiments of the present invention. Further, for clarity of discussion, it is understood that a user, such as a system administrator, may be operating the remote device 220 and that the user and the remote device 220 may be referred to interchangeably.

According to one embodiment, the remote device 220 includes an administrator e-mail client 222 that receives from the e-mail server 210 e-mail messages that pertain to the operation of virtualized computer system 100. In some embodiments, the administrator e-mail client 222 may be a software application configured to generate, transmit, receive, and display e-mail messages via any of the e-mail techniques and protocols known in the art, including Simple Mail Transfer Protocol (SMTP), Post Office Protocol (POP), and Internet Message Access Protocol (IMAP). In one embodiment, the administrator e-mail client 222 is configured to support "push" notifications to reduce communication between the administrator command server 120 and the remote device 220.

As is described in detail herein, the administrator e-mail client 222 is configured to provide a set of features through which embodiments of the invention may be implemented. In particular, administrator e-mail client 222 is configured to receive e-mails that are generated by administrator command server 120 and, among other features described herein, parse text in the body of the e-mails and established therein hyperlinks that, when selected by the administrator, cause the administrator e-mail client 222 to issue commands to and receive information from administrator command server 120.

In one embodiment, the e-mail module 202 is configured to generate e-mail messages containing output from the VM management center 102 and addressed to one or more recipients responsible for the VM management center 102, such as a system administrator. In one example, the e-mail module 202 generates and transmits an e-mail message containing an alert message (sometimes referred to as an "alert") that notifies system administrators of a condition in the VM management center 102 (e.g., system outage). In another example, the e-mail module 202 generates an e-mail message containing output from the VM management center 102 (herein referred to as "status message") in response to a specific command received from the system administrators, which is described below in detail. For example, a status message indicating an uptime condition of the virtualized computer system 100 may be sent by the e-mail module 202 in response to receiving a command requesting "status." In another example, a status message may be generated that contains a verbose output indicating a successful or unsuccessful execution of a command.

In one particular implementation, the e-mail module 202 utilizes one or more software libraries to programmatically interact with the e-mail server 210 and perform one or more e-mail related functions. For example, the e-mail module 202 may utilize Java APIs for fetching e-mail from the e-mail server 210, extracting e-mail metadata and data, generating new e-mail messages, and sending e-mail messages to recipients, such as the remote device 220, via the e-mail server 210. Embodiments of the invention may be extended to utilize other suitable software libraries, frameworks, and APIs for implementing the techniques described herein.

In one embodiment, the command controller 204 of the administrator command server 120 is configured to receive and process hypertext protocol (http) requests issued via administrator e-mail client 222. In one example, command controller 204 is configured to receive the http requests via network 250 at an internet protocol (IP) address, e.g., "10.10.10.10", and a network port, e.g., "9080". In this example, each http request is generated and transmitted to the command controller 204 when the administrator e-mail client 222 queries a uniform resource locator (URL) that is generated by the administrator e-mail client 222 according to the configuration of the command controller 204, one or more commands to be executed, and one or more entities to which the one or more commands refer. The one or more commands and one or more entities are specified via parameters included in the URL, which command controller 204 is configured to extract using, e.g., the "&parameter_name=value" paradigm. Though the techniques described herein utilize issuing commands via http requests, any suitable means for communication over a computer network may be used, including Simple Object Access Protocol (SOAP), WebSocket Protocol, Remote Procedure Calls (RPC), and other similar technologies.

The command controller 204 is configured to invoke the command interpreter 206 to communicate with the VM management center 102 and execute commands based on the parameters included in the URL. The command interpreter 206 is configured to transmit commands to the VM management center 102 and/or receive output resultant from the transmitted commands or otherwise unsolicited status output from the VM management center 102.

In one embodiment, the command controller 204 extracts parameters included in the URL, and, based on the extracted parameters, generates a script that is executable by the command line interpreter 206. Examples of the command interpreter 206 include PowerCLI, vSphere SDK for Perl for VMware vSphere available from VMware, Inc. of Palo Alto, Calif., or one of a variety of other suitable command-line interpreter systems.

Figure 3:
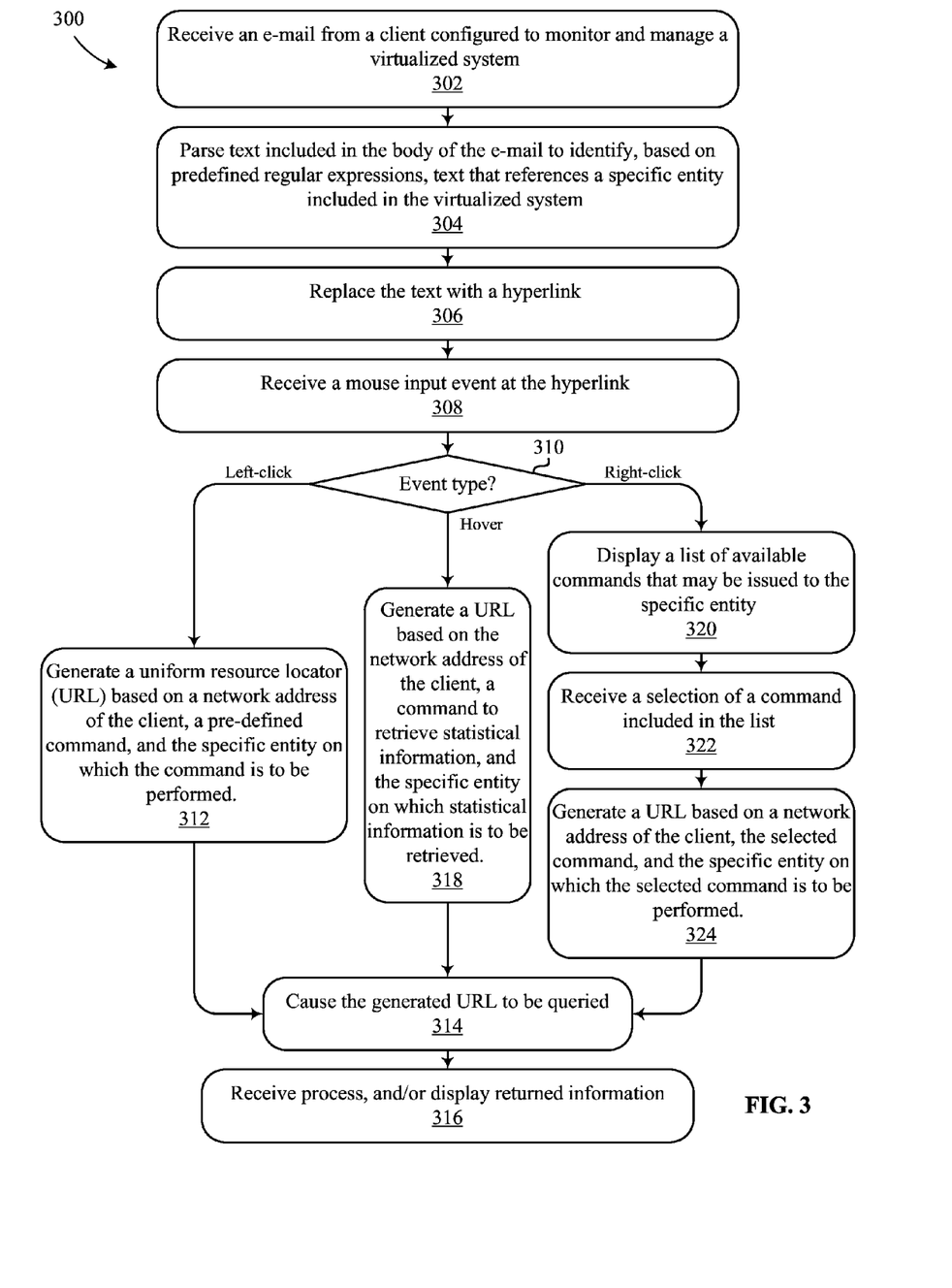
FIG. 3 illustrates exemplary operations of a method for e-mail-based management of a virtualized computing environment, according to one embodiment of the present invention.

FIG. 3 illustrates example operations of a method 300 for e-mail-based management of virtualized computer system 100, according to one embodiment of the present invention. As shown, the method 300 begins at step 302, where the administrator e-mail client 222 receives an e-mail from administrator command server 120 (via e-mail server 210). Because the administrator e-mail client 222 may receive e-mails that are not issued from administrator command server 120, e.g., e-mails from a personal e-mail account, the administrator e-mail client 222 is configured to execute the method steps subsequent to step 302 only after verifying that the e-mail is received from administrator command server 120, e.g., by checking header fields included in the e-mail. In one embodiment, a user of remote device 220, e.g., an administrator of virtualized computer system 100, is initially required to authenticate with administrator command server 120 so that he or she may receive e-mails from and/or issue commands to administrator command server 120 through administrator e-mail client 222. The authentication may be performed according to a variety of techniques.

In one embodiment, an authentication approach based on security tokens may be utilized. System administrators are issued a hardware or software mechanism for generating an authentication code, the mechanism referred to as a "token." For example, the system administrator may have a smart card or a key fob configured to dynamically generate a secret value that is automatically and periodically changed. In this approach, administrator e-mail client 222 requires that the system administrator submits his or her token when logging into administrator e-mail client 222. The token value is thereafter included as a parameter in each of the URLs that are used to issue commands. To authenticate the sender, the administrator command server 120 first retrieves a token value from a security database storing a plurality of synchronous values based on the sender's purported identity, which is included as a parameter in the URL. The administrator command server 120 then compares the token value from the security database to the token value from the URL. After the administrator command server 120 verifies that the tokens match, then the administrator command server 120 may deem the identity of the sender of the command as being authenticated.

In another embodiment, an authentication approach based on "pass codes" may be utilized. A pass code generally refers to a predetermined value known only to the system administrator. Similar to the token approach discussed above, the URLs include a parameter for the pass code. In one embodiment, after the administrator command server 120 verifies the presence of the pass code in the URL and determines that the pass code corresponds to a value stored in a security database, then the administrator command server 120 may deem the identity of the sender of the command as being authenticated. Transmission of the pass code via a URL parameter can be protected from security threats using a variety of approaches, e.g., establishing a secure socket layer (SSL) communication path between the administrator command server 120 and the administrator e-mail client 222.

In still another embodiment, an authentication approach based on a trusted communications environment may be utilized. Embodiments of the invention may require a secure connection between the remote device 220 and the administrator command server 120, such as in VPN connections. In one embodiment, the administrator command server 120 may store a trusted network list comprising a pre-determined list of network addresses, subnet addresses, and other network domains that represent a trusted network environment. The administrator command server 120 may deem a command authentic if the command originates from within the trusted network environment, for example, inside a company's intranet. In this approach, no authentication parameters would be required to be included in the URL.

Referring back now to step 302, the received e-mail may have been generated, for example, by administrator command server 120 in response to an alert condition detected within the virtualized computer system 100. More specifically, the administrator command server 120, in response to receiving a notification from the VM Management Center 102 that an alert condition has been detected for the virtualized computing environment, directs the e-mail module 202 to generate an alert e-mail to one or more system administrators. In one embodiment, the administrator command server 120 may wait for a response back from at least one system administrator to which the alert has been communicated. In one embodiment, the administrator command server 120 utilizes a time-out timer wherein if no response to the alert e-mail is received by expiry of the time-out timer, then error handling procedures are invoked, such as resending the alert e-mail. In one embodiment, the time-out timer may be cancelled upon receipt of one or more "read receipts" from the administrator e-mail client 222 indicating successful delivery of the alert e-mail messages.

At step 304, the administrator e-mail client 222 parses text included in the body of the e-mail to identify, based on pre-defined regular expressions known to administrator e-mail client 222, text that references a specific entity included in the virtualized computer system 100, e.g., a VM, a host machine, a cluster, and the like. One example form of a regular expression might be "VM-\d\d\d", which would match the text "VM-123" that refers to a VM named "VM-123" included in virtualized computer system 100.

At step 306, the administrator e-mail client 222 replaces the text with one or more hyperlinks. In particular, the hyperlinks are established by administrator e-mail client 222 as objects within the e-mail body that are configured to detect mouse input events. In one embodiment, each predefined regular expression may have associated therewith a set of available commands that are displayed to the administrator when a mouse input even occurs at the hyperlink, an example of which is illustrated in Table 1.

At step 308, the administrator e-mail client 222 receives a mouse input event at the hyperlink. In one embodiment, the mouse input event is received via one or more listener methods that are associated with the hyperlink and managed by the administrator e-mail client 222. The mouse input events include information specific to the mouse input, such as the mouse button that was clicked (i.e., left-click or right-click), or the amount of time that the mouse cursor was positioned over the hyperlink (i.e., hover).

At step 310, the administrator e-mail client 222 determines whether the mouse input event is a mouse left-click event, a mouse hover event, or a mouse right-click event. If, at step 310, the administrator e-mail client 222 determines that the mouse input event is a mouse left-click, then the method 300 proceeds to step 312. At step 312, administrator e-mail client 222 generates a URL based on a network address of the administrator command server 120, a selected command, and the specific entity on which the command is to be performed.

As described above, each of the available commands included in Table 1 is associated with a set of instructions that cause the appropriate command to be executed. For example, the command "generate_logBundle" may have associated therewith Javascript instructions that, when executed by administrator e-mail client 222, cause the URL to be generated and then queried. One example URL is "http://10.10.10.10:9080/zSphere?action=generate_logBundle&entity_name=VM-123", where the IP address 10.10.10.10 and port 9080 of administrator command server 120 are known to administrator e-mail client 222, the entity name "VM-123" is identified as a regular expression at step 304, and generate_logBundle is the command selected by the administrator.

At step 314, the administrator e-mail client 222 causes the generated URL to be queried. In one embodiment, the administrator e-mail client 222 is capable of issuing the query via built-in http features, such as a web browser that is configured to manage http requests. In another embodiment, the administrator e-mail client 222 issues a call to the operating system on which it is executing, e.g., the operating system of remote device 220, to handle querying the generated URL.

In turn, the administrator command server 120 receives the request containing one or more commands for managing the virtualized computing environment 100. The command controller 204 receives the request from the administrator com-

TABLE 1

| Regular Expression | Mouse Left-Click | Mouse Hover | Mouse Right-Click |
|---|---|---|---|
| "VM-\d\d\d" | {generate_logBundle} | {get_statistics_chart} | {power_on, power_off, suspend, reset, motion} |
| "HC-\d\d\d" | {generate_logBundle} | {get_statistics_chart} | {enter_maintenance_mode} |
| "DS-\d\d" | {generate_logBundle} | {get_statistics_chart} | {increase_size} |

As shown, in one embodiment, each regular expression has associated therewith, for each of three different types of mouse events (left-click, hover, right-click), one or more available commands that the administrator may issue to administrator command server 120 for execution. For example, the administrator may power on, power off, suspend, reset, or motion a VM that is identified through the regular expression "VM-\d\d\d". Each command, such as "get_statistics_chart", is issued by administrator e-mail client 222 according to a set of instructions associated with the command, which is described in detail below at steps 312, 318 or 320.

mand server 120 and then proceeds to perform one or more procedures for validating the received command, according to embodiments of the invention.

As described above, the command controller 204 performs one or more authentication procedures to verify the identity of the user (i.e., sender of the command). If the command controller 204 determines that the command is not authorized, then the administrator command server 120 may initiate error handling by sending an error message to the user via the e-mail server 210. In one embodiment, the error message is a response e-mail notifying the user of an "unauthorized command," "unauthenticated command," and/or other error reporting details.

After authenticating the administrator, the administrator command server 120 determines whether the administrator is authorized to submit and execute the one or more administrative commands for the VM management center 102 that are specified in the URL.

According to one embodiment, a plurality of users may be granted specific roles and permissions for operating the VM management center 102 via the administrator command server 120. By limiting the users, actions, and objects that can be manipulated by e-mail-based management, as well as limiting the frequency and/or time periods with which commands may be issued, the administrator command server 120 may limit risk of access from an unauthorized channel or user. Such roles and permissions for managing components of the virtualized computing environment may be granted or denied to one or more users and/or groups. For example, one user may be designated as a system administrator for a particular a data cluster, a particular host computer, and/or for a virtual machine executing on one or more host computers. It is appreciated that responsibilities for specific virtualized computer inventory components, such as resource pools, can be delegated based on business organization or ownership. In one embodiment, the roles and permissions may be stored within and managed by the administrator command server 120 or the VM management center 102, or alternatively, may be stored separately, for example, in a lightweight directory access protocol (LDAP) database.

In one embodiment, the administrator command server 120 retrieves the roles and permissions associated with the sender of a command based on the sender's identity, e.g., as authenticated in the preceding step. Based on the retrieved permissions, the administrator command server 120 determines whether the sender has authorization to issue commands to the VM management center 102. For example, the administrator command server 120 may determine whether the sender is authorized to execute any administrative commands at all, whether the sender is authorized to execute the particular administrative commands specified in the received e-mail, whether the sender is authorized to execute commands on the one or more particular virtualized components identified in the commands, or some combination thereof. If the commands included in the email are permissible, then command is deemed authorized.

In some embodiments, rather than entirely allow or disallow a command based on roles and permission, the administrator command server 120 may determine that the command from a user requires further approval from a supervisor user. Users may be assigned supervisory-subordinate relationships such that a supervising user may have to review and authorize a command and/or operation submitted by a subordinate user before the administrator command server 120 will process submitted commands. The administrator command server 120 may generate and send an approval request e-mail to a designated supervisor to request approval of the subordinate user's command. The approval request may contain a description of the commands requested by the subordinate user, a description of the subordinate user's identity, and instructions on how to approve the pending commands. In one embodiment, the instructions may include a hyperlink containing a custom identifier (e.g., hash code) to a web-accessible approval script. In another embodiment, the instructions include text indicating the supervisor user may reply directly to the approval request e-mail with an e-mail that contains a command word indicating approval or denial (e.g., "APPROVE", "DENY") in the body of the e-mail. After the administrator command server 120 receives approval, through one of the embodiments described above, the administrator command server 120 deems the user authorized.

Administrator command server 120, upon determining that the user is authorized, translates the commands into instructions that are executable by VM management center 102, and transmits the instructions to VM management center 102 for execution. Administrator command server 120 may monitor the VM management center 102 while the instructions are executed or wait for the VM management center 102 to indicate that the instructions have been executed. When VM management center 102 completes the execution of the instructions, administrator command server 120 issues a response to administrator e-mail client 222. The response may include any type of data associated with the commands including, but not limited to, status information, statistical information, return data information, and the like.

Accordingly, at step 316, the administrator e-mail client 222 receives, processes and/or displays information returned by administrator command server 120 in response to the command issued via the URL query at step 314. Continuing with the example of requesting a log bundle for the VM "VM-123" described above at step 312, the returned log bundle may be displayed within administrator e-mail client 222. Alternatively, administrator e-mail client 222 may receive a redirect to a URL of a temporary web page managed by administrator command server 120 that provides a detailed view of the log bundle for the VM "VM-123".

Referring back now to step 310, if the administrator e-mail client 222 determines that the mouse input event is a mouse hover, then the method 300 proceeds to step 318. At step 318, the administrator e-mail client 222 generates a URL based on the network address of the client, a command to retrieve information, e.g., statistical information, and the specific entity on which information is to be retrieved. In some cases, administrator e-mail client 222 may be configured to further parse the body of the e-mail to identify keywords that help narrow the information that should be requested. For example, if the e-mail body indicates that a VM named "VM-123" has a high ready time, which is related to the VM's CPU usage, then the administrator e-mail client 222 may append to the generated URL a parameter that narrows the requested information to CPU usage only, e.g., "&statistic_type=CPU_Usage". In some embodiments, administrator e-mail client 222 and/or administrator command server 120 may be configured to automatically include knowledge base articles that are relevant to the information included in the body of the e-mail, such as typical causes for a VM experiencing a high ready time.

Figure 5A:
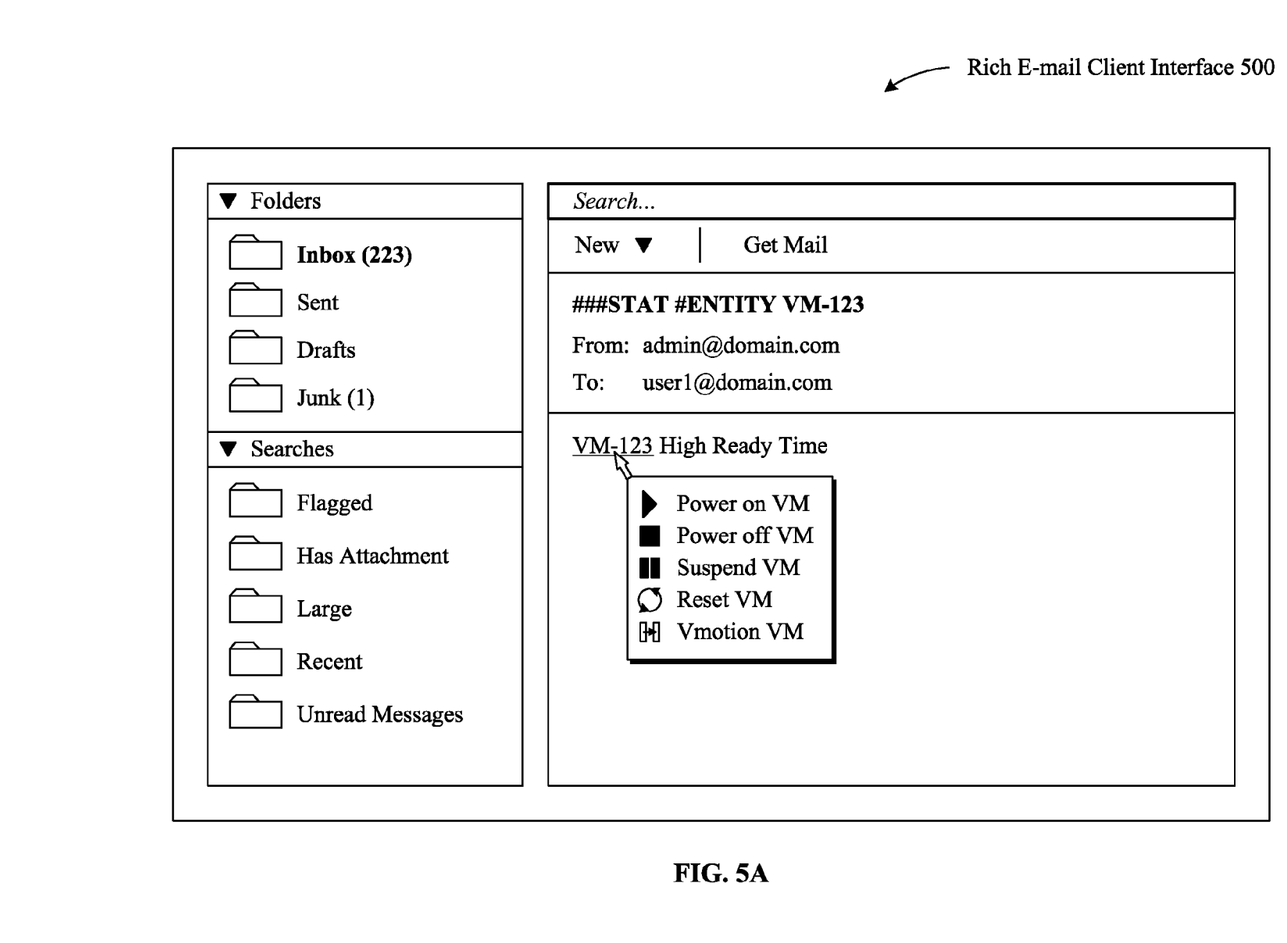
FIGS. 5A-5C illustrate screenshots of an interface of an administrator e-mail client configured to manage a virtualized computing environment, according to one embodiment of the present invention.
Figure 5B:
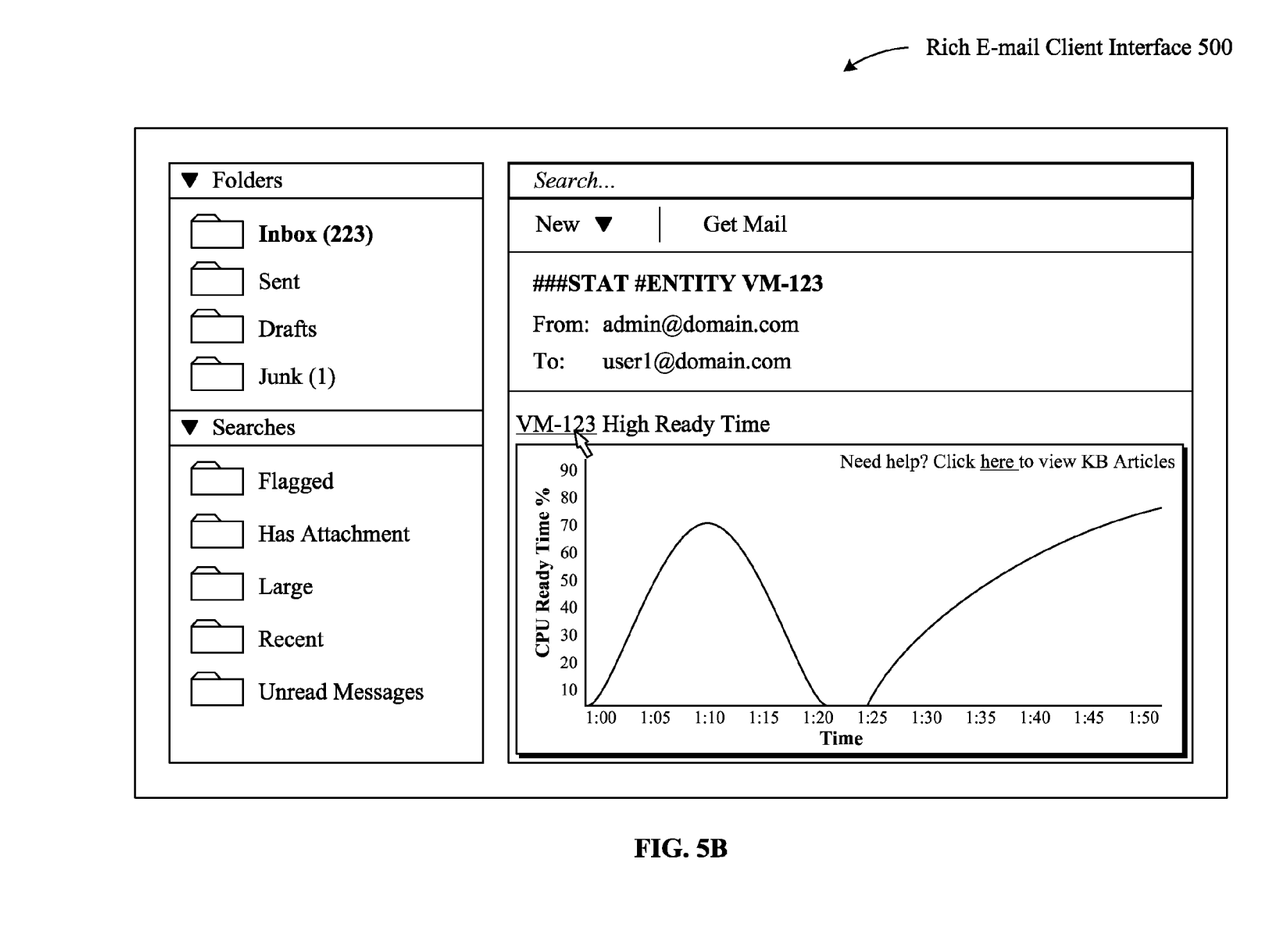

Next, administrator e-mail client 222 executes method step 314 using the URL generated at step 318 according to the techniques described above. At step 316, administrator e-mail client 222 receives and displays the returned information, such as a chart that highlights CPU usage data of the VM "VM-123". Moreover, as described above, the chart may include knowledge base text and/or hyperlinks to knowledge base articles. An example of such a chart is illustrated in FIG. 5B.

Referring back now to step 310, if the administrator e-mail client 222 determines that the event type is a mouse right-click, then the method 300 proceeds to step 320. At step 320, the administrator e-mail client 222 displays a list of available command options that may be issued to the specific entity associated with the hyperlink on which the right-click mouse event occurred. In one embodiment, the list is displayed as a context menu located at or around the hyperlink. An example of the context menu is illustrated in FIG. 5A, which corresponds to the available commands for a VM hyperlink on which a mouse right-click occurs.

At step 322, the administrator e-mail client 222 receives a selection of a command option included in the list, e.g., "power-on". Accordingly, at step 324, the administrator e-mail client 222 generates a URL based on the network address of the administrator command server 120 (e.g., "10.10.10.10:9080"), the command option (e.g., "power-on"), and the specific entity on which the command is to be performed (the VM "VM-123").

Next, administrator e-mail client 222 executes method step 314 using the URL generated at step 324. At step 316, administrator e-mail client 222 receives and displays information returned by the command, e.g., the status of the command's execution.

In some embodiments, the administrator command server 120 generates and sends confirmation messages to the administrator to notify the administrator that the command has been successfully received. For example, after an administrator selects an available command through the right-click context menu described above, administrator e-mail client 222 may continue to display the right-click context menu and update the status of the command, such as estimated time left to complete in execution.

Figure 4:
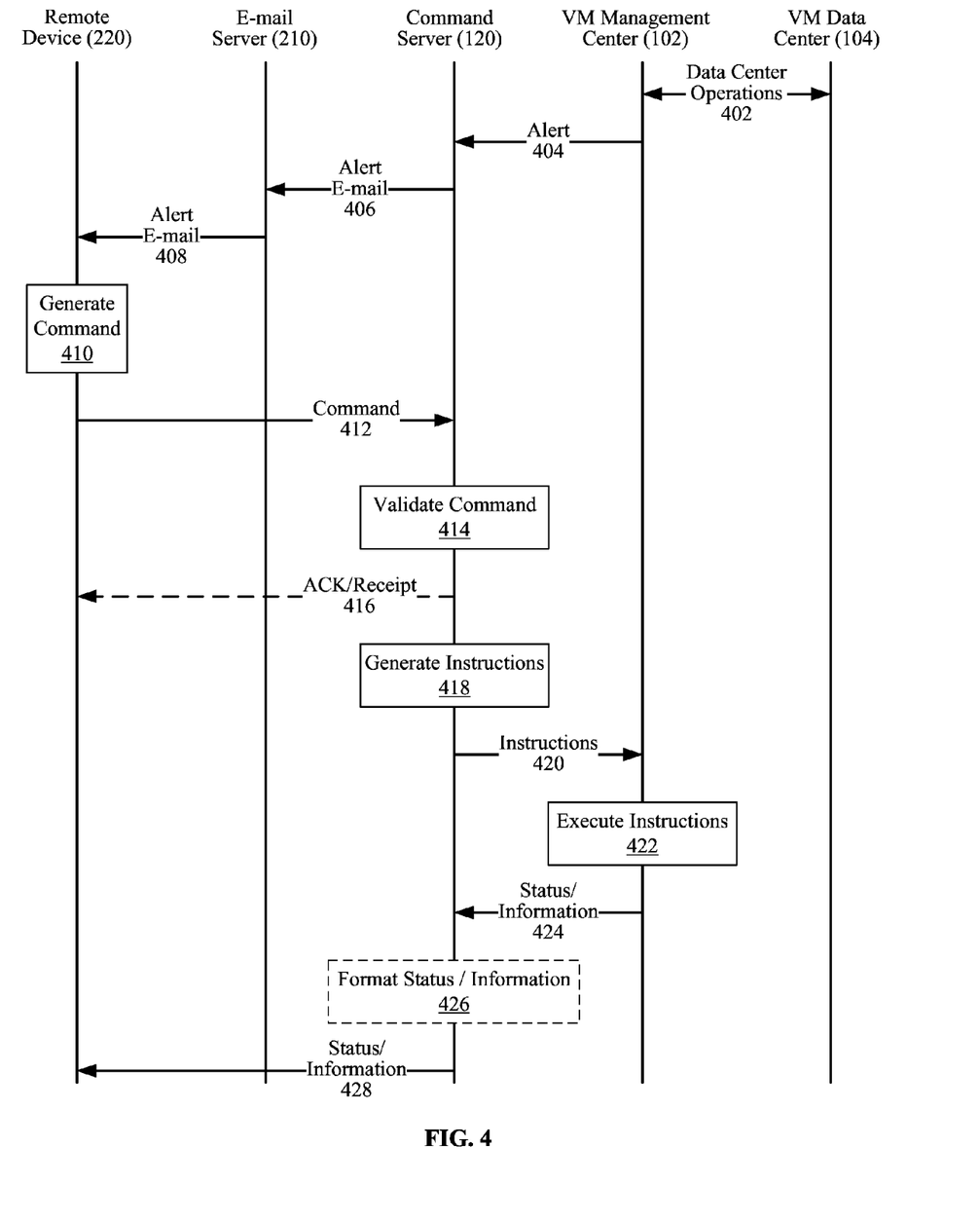
FIG. 4 is a sequence diagram that illustrates example operations for e-mail-based management of a virtualized computing environment, according to one embodiment of the present invention.

FIG. 4 is a sequence diagram that illustrates example operations for e-mail-based management of the virtualized computer system 100, according to one embodiment of the present invention. In particular, the operations of system 200 are shown in FIG. 4. While the example operations are depicted as being performed by the system 200 of FIG. 2, it is contemplated that embodiments of the invention may be performed by other suitable systems.

Step 402 is representative of operations that occur within a VM Data Center 104, such as VM migrations between host machines, new host machines being provisioned, new VMs being provisioned, and the like. At step 404, the administrator command server 120 receives a notification from the VM management center 102 that a potential issue, condition, and/or problem has been detected in the VM data center 104. For example, the administrator command server 120 may receive a notification that a VM in the data center 104 is over-provisioned, experiencing overload, unresponsive, and/or the like.

In one embodiment, responsive to detecting an alert condition, the e-mail module 202 of the administrator command server 120 generates at step 406 an e-mail alert message for one or more system administrators designated as contacts for such alert messages. The e-mail module 202 of the administrator command server 120 then connects to the e-mail server 210 and transmits the alert message. The alert e-mail includes an e-mail body containing a description of the alert condition, e.g., "VM-123 High Ready Time."

In one embodiment, the e-mail module 202 generates an alert e-mail having additional metadata information for facilitating processing techniques described herein, such as automatic filtering of e-mails received by administrator e-mail client 222 into virtualization-specific folders, described in detail below in conjunction with FIG. 5C. The e-mail module 202 may generate an alert e-mail having a unique reference identifier for the alert condition, referred herein as an "alert identifier." The alert identifier may be located in the e-mail body and/or in the subject line (e.g., "Subject: Alert #20110819.1547920A"). Alternatively, the alert identifier may be located within one or more custom metadata fields in the e-mail header (e.g., "X-AlertMessageID: 20110819.1547920A").

One example of an alert e-mail to a plurality of system administrators, having e-mail addresses such as "admin1@zsphere.com," "admin2@zsphere.com," "admin3@zsphere.com," may appear as follows:

```
From:    commandgateway@zsphere.com
To:      admin1@zsphere.com, admin2@zsphere.com,
         admin3@zsphere.com
Subject: Issue #20110819.1547920A HC-898 at 192.168.0.181 has CPU Load of 99% for a time period
exceeding 12 hour(s).
------------------------------
NOTE: This alert [#20110819.1547920A] has been sent to you
because you have been designated a system administrator for VM
Center ALPHA.
------------------------------
```

At step 408, the administrator e-mail client 222 of the remote device 220 connects to the e-mail server 210 and retrieves any e-mail messages, including the alert message, addressed to the system administrator operating the remote device 220. The administrator e-mail client 222 makes available the alert message for review by the system administrator according to the techniques described above in steps 302-306 of method 300. At some time later, the system administrator reads the alert message and responds to the alert message by interfacing with the rich e-mail features provided by the administrator e-mail client 222 described herein.

At step 410, the administrator e-mail client 222 generates a command based on input from the administrator according to the techniques described above in steps 308-324 of method 300. At step 412, administrator e-mail client 222 issues the command to administrator command server 120 by querying the generated URL, according to the method step 314 of method 300.

At step 414, the administrator command server 120 validates the command to determine whether to proceed with processing the received command. At optional step 416, the administrator command server 120 sends an acknowledgement message to notify the remote device 220 that command has been received. In the embodiment shown, the acknowledgment message is delivered via an http response message sent to the remote device 220 via the network 250.

At step 418, the administrator command server 120 identifies one or more commands based on parameters included in the URL query. In one embodiment, the command interpreter 206 of the administrator command server 120 interprets the parameters and, in response, generates one or more instructions that are executable by the VM management center 102. In one embodiment, the administrator command server 120 places the extracted commands into temporary storage, for example, such as in a queue. The command interpreter 206 at step 420 connects to the VM management center 102 to relay the instructions to the VM management center 102 for execution. At step 422, the VM management center 102 executes the instructions to perform one or more data center operations on the VM data center 104.

After the instructions have been executed, the VM management center 102 may provide at step 424 a summary of the actions taken and the post-execution status of the virtualized computer system 100 entities affected by the command. At step 426, the administrator command server 120 receives from the VM management center 102 the status results and/or other output resultant from execution of the command. In some cases, the administrator command server 120 formats the information into a final form so that the administrator e-mail client 222 needs only to display the information received at step 428. For example, administrator command server 120 may generate an image of a statistical chart based on data received from VM data center 104 at step 424. In this way, the statistical chart can be viewed on any of the mobile devices 220, 230 and 232, since the operating systems and/or administrator e-mail clients 222 executing thereon are configured to interpret and display images (e.g., in JPEG format, BMP format, GIF format, etc.) according to well-known techniques.

Figure 5C:
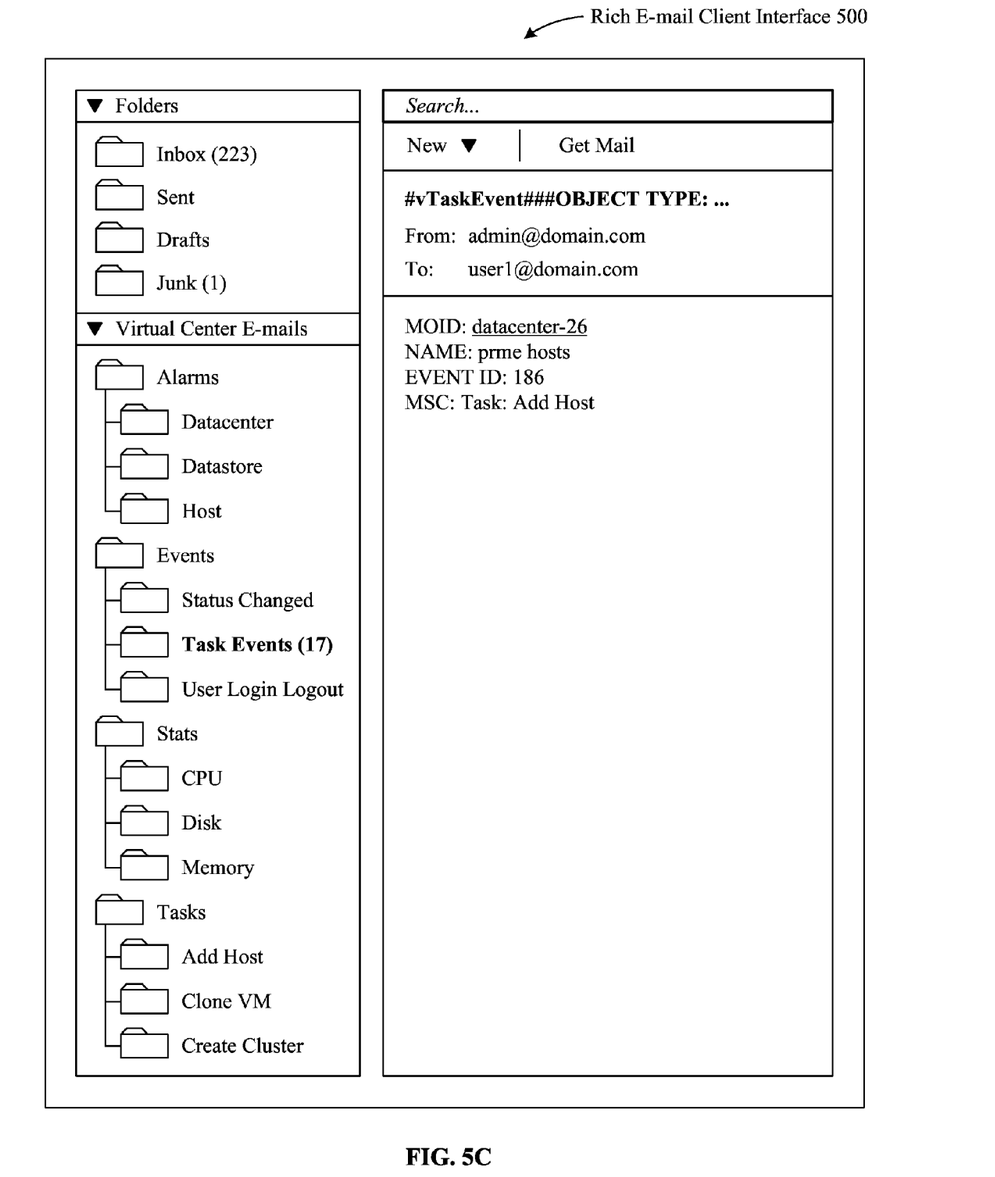

FIGS. 5A-5C illustrate screenshots of an interface 500 of the administrator e-mail client 222, according to embodiments of the invention. In particular, FIG. 5A illustrates an exemplary interface of the administrator e-mail client 222 displaying to an administrator the available commands that he or she may issue to the VM-123. Again, administrator e-mail client 222 is configured to display such commands when a mouse right-click event is detected at the hyperlink "VM-123" that is generated by administrator e-mail client 222 when the e-mail is received.

FIG. 5B illustrates and exemplary interface of administrator e-mail client 222 displaying to an administrator information that is gathered in response to a mouse hover occurring over the hyperlink for "VM-123". As shown, the information may include knowledge base information that administrator command server 120 and/or VM management center 102 determine is relevant to the e-mail message and/or gathered information.

FIG. 5C illustrates an exemplary interface of administrator e-mail client 222 configured to filter incoming e-mail messages. In particular, administrator e-mail client 222 automatically filters and prioritizes e-mails into pre-defined folders that are relevant to the management of virtualized computer system 100. For example, e-mails that are generated in response to failed tasks may be automatically placed into the "Task Events" folder and have a high-priority associated with them. In some cases, high-priority e-mails may include an icon that indicates urgency, such as an exclamation point. The administrator may create his or her own folders and priority rules for e-mails in addition to the pre-defined folders and rules associated with which administrator e-mail client 222 is configured. Additionally, administrator e-mail client 222 provides full-text e-mail search functionality, which enables the administrator to search through e-mails stored either locally on remote device 220 or stored archived on e-mail server 210. Advantageously, the administrator can use full-text search to gather valuable information about the virtualized computer system 100. For example, if administrator command server 120 is configured to e-mail the administrator whenever the CPU "ready time" for any VM exceeds 10% for a threshold amount of time, the administrator can execute a full-text search of all such e-mails to find a history of VMs whose ready time has exceeded 10%. Moreover, the searches and their criteria can be saved to enable the administrator to easily execute the searches that are most useful to the administrator. Additionally, for any e-mails that are accessed by the administrator (e.g., via direct access through a pre-defined folder or by executing a search) and include hyperlinks that were created by the administrator e-mail client 222, the hyperlinks, when accessed by the administrator (e.g., by left-clicking, right-clicking, or hovering over the hyperlink), cause the administrator e-mail client 222 to execute a corresponding function and return up-to-date information that corresponds to the entity to which the hyperlink refers (e.g., up-to-date statistical data for a VM to which the hyperlink corresponds).

Embodiments of the invention advantageously provide a platform-independent command interface for managing a virtualized infrastructure via remote devices. Because the administrator is communicating with the command server via an administrator e-mail client, the need is reduced for an administrator to have a command interpreter running on his/her remote device or to connect to a server using a VPN in order to perform system management tasks. Finally, as there are no platform requirements for the e-mail client of the remote device, an administrator may perform management commands using any device that has an e-mail client and is not limited to a particular platform, such as Android-based phones, iOS-based phones, or Windows-based phones.

Additionally, embodiments of the invention may be extended to include desktop computers, notebook computers, servers, and other suitable computing devices configured for network connectivity, and having available the administrator e-mail client as described herein.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments, or as embodiments that tend to blur distinctions between the two. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computing device comprising:
    a display; and
    a processor programmed to detect receipt of an e-mail from a management server for managing virtual machines and, in response to the detecting,
    to parse content included in the e-mail to identify a managed virtual machine and to generate an e-mail user interface (UI) on the display,
    wherein the UI includes a first region for displaying a message from the management server, and a second region for displaying a UI element that identifies the managed virtual machine and that, in response to a predetermined input made thereon, displays a menu of commands for causing a command server to generate instructions for controlling the identified virtual machine and generates a command to cause the command server to generate and send instructions for managing the identified virtual machine to the management server, and wherein the UI element is a hyperlink and the command is a uniform resource locator (URL) Query.

2. The computing device of claim 1, wherein the predetermined input generates a system event, the system event including one of a mouse left-click event, a mouse hover event, and a mouse right-click event.

3. The computing device of claim 1, wherein the command is a command to cause the command server to generate instructions for the management server to power on or power off the virtual machine.

4. The computing device of claim 2, wherein the system event causes a command to be generated, wherein the command causes the command server to generate instructions for the management server to return statistics about the virtual machine and to send the instructions to the management server.

5. The computing device of claim 4, wherein the UI displays the statistics that are returned from the management server to the command server.

6. The computing device of claim 2, wherein a selection of one of the commands causes the selected command to be generated and sent to the command server.

7. The computing device of claim 1, wherein the UI is generated from a status communication formatted in a markup language that is received from the command server.

8. A method of processing communications from a management server for managing virtual machines, comprising:
    detecting receipt of an e-mail containing a status communication from a management server for managing virtual machines;
    in response to detecting receipt of the e-mail, parsing content included in the e-mail to identify a managed virtual machine and generating an e-mail user interface (UI), wherein the UI includes a first region for displaying a message from the management server contained within the status communication, and a second region for displaying a UI element that identifies the managed virtual machine; and
    detecting a predetermined input on the UI element and, in response thereto, displaying a menu of commands for causing a command server to generate instructions for controlling the identified virtual machine and generating a command to cause the command server to generate and send instructions for managing the identified virtual machine to the management server, wherein the UI element is a hyperlink and the command is a uniform resource locator (URL) query.

9. The method of claim 8, further comprising:
    parsing the e-mail to locate text that identifies an entity in a virtualized computing environment; and
    replacing the located text with a UI element.

10. The method of claim 8, wherein the predetermined input generates a system event, the system event including one of a mouse left-click event, a mouse hover event, and a mouse right-click event.

11. The method of claim 10, wherein the generated command is a command that causes the command server to generate instructions for the management server to power on or off the virtual machine.

12. The method of claim 10, wherein the generated command is a command that causes the command server to generate instructions for the management server to return statistics about the virtual machine.

13. The method of claim 10, wherein the generated command is one of a plurality of commands for causing the command server to generate instructions for controlling a virtual machine that are displayed in the UI in response to the system event.

14. A non-transitory computer readable storage medium comprising instructions to be executed in a computing device to cause the computing device to perform the steps of:
    in response to a receipt of an e-mail containing a status communication from a management server for managing virtual machines, parsing content included in the e-mail to identify a managed virtual machine and generating an e-mail user interface (UI), wherein the UI includes a first region for displaying a message from the management server contained within the status communication, and a second region for displaying a UI element that identifies the managed virtual machine; and
    detecting a predetermined input on the UI element and, in response thereto, displaying a menu of commands for causing a command server to generate instructions for controlling the identified virtual machine and generating a command to cause the command server to generate and send instructions for managing the identified virtual machine to the management server, wherein the UI element is a hyperlink and the command is a uniform resource locator (URL) Query.

15. The non-transitory computer readable storage medium of claim 14, wherein the predetermined input generates a system event, the system event including one of a mouse left-click event, a mouse hover event, and a mouse right-click event.

16. The non-transitory computer readable storage medium of claim 14, wherein the generated command is a command that causes the command server to generate instructions for the management server to power on or off the virtual machine.

17. The non-transitory computer readable storage medium of claim 14, wherein the generated command is a command that causes the command server to generate instructions for the management server to return statistics about the virtual machine.

18. The non-transitory computer readable storage medium of claim 14, wherein the generated command is one of a plurality of commands for causing the command server to generate instructions for controlling a virtual machine that are displayed in the UI in response to the system event.

* * * * *